United States Patent [19]

Furusawa et al.

[11] Patent Number: 4,893,527
[45] Date of Patent: Jan. 16, 1990

[54] SPEED CHANGE CONTROL APPARATUS FOR AUTOMATIC TRANSMISSIONS

[75] Inventors: Choji Furusawa, Aichi; Masato Shimei, Nagoya; Toshiaki Ishiguro, Nagoya; Katsuhiko Hattori, Nagoya; Hiroyuki Yamaguchi, Aichi, all of Japan

[73] Assignees: Aisin Seiki Kabushiki Kaisha, Kariya; Kabushiki Kaisha Toyota Chuo Kenkyusho, Aichi, both of Japan

[21] Appl. No.: 100,364

[22] Filed: Sep. 23, 1987

[30] Foreign Application Priority Data

Sep. 24, 1986 [JP] Japan .................... 61-223841

[51] Int. Cl.$^4$ ............................. B60K 41/18
[52] U.S. Cl. ............................. 74/866
[58] Field of Search ....................... 74/866

[56] References Cited

U.S. PATENT DOCUMENTS

| | | | |
|---|---|---|---|
| 3,956,947 | 5/1976 | Leising et al. | 74/866 |
| 4,513,639 | 4/1985 | Hiramatsu | 74/866 |
| 4,519,273 | 5/1985 | Shimizu et al. | 74/866 X |
| 4,671,139 | 6/1987 | Downs et al. | 74/866 |
| 4,680,988 | 7/1987 | Mori | 74/866 |
| 4,706,522 | 11/1987 | Nitz | 74/866 |
| 4,753,135 | 6/1988 | Sotoyama et al. | 74/866 |

Primary Examiner—Dirk Wright
Attorney, Agent, or Firm—Burns, Doane, Swecker & Mathis

[57] ABSTRACT

A speed change control apparatus for an automatic transmission having a plurality of friction elements in which a gear stage is established by engaging one of the friction elements and disengaging one of the others. The speed change control apparatus includes control valves connected to respective ones of the friction elements, a duty solenoid valve connected to each oil line supplying a respective one of the control valves with control hydraulic pressure, and control means for engaging one friction element by outputting an engagement duty signal to one duty solenoid valve to control the control hydraulic pressure, and disengaging one of the other friction elements correspondingly by outputting disengagement duty signals to one of the other duty solenoid valves to control the control hydraulic pressure.

19 Claims, 6 Drawing Sheets

SPEED CHANGE CONTROL APPARATUS FOR AUTOMATIC TRANSMISSIONS

BACKGROUND

This invention relates to a speed change control apparatus for an automatic transmission having at least two friction elements in which a gear stage is established by engaging one of the friction elements and disengaging the other.

Various automatic transmissions having at least two friction elements are known in the art. A first such configuration employs a one-way clutch in the gear train in order to mitigate shock when a speed change is made. A second example is as described in the specification of Japanese Patent Publication (KOKOKU) No. 49-40585, in which hydraulic control valves (timing valves) and accumulators are connected to a hydraulic control circuit to control the timing of the friction element to be engaged and the friction element to be disengaged.

DISCUSSION OF THE PRIOR ART

The first example of the conventional automatic transmission is disadvantageous in that the one-way clutch is high in cost. Another drawback is that the transmission itself has a large overall length. The shortcomings of the second example of the automatic transmission will be understood from the hydraulic characteristics of FIG. 8. In order to obtain the hydraulic characteristic $\alpha$ at disengagement and the hydraulic characteristic $\beta$ at engagement shown in FIG. 8, a hydraulic circuit of the kind shown in FIG. 9 is employed. In accordance with the prior art, hydraulic pressure in the interval a–b at disengagement of the friction element and hydraulic pressure in the interval c–d at engagement of the friction element are regulated by accumulators 1 and 2, respectively. However, the spool of a shift valve 3 is two to three times the size of an ordinary valve spool, and timing valves 6, 7 are required in order to control the timing of two friction elements 4, 5, respectively. The drawback that results is a hydraulic control section which is large in size.

SUMMARY OF THE DISCLOSURE

An object of the present invention is to provide an automatic transmission speed change control apparatus in which, in order to engage and disengage a plurality of friction elements without using a one-way clutch or accumulators and timing valves, a hydraulic pressure pattern necessary for controlling two friction elements is realized.

Other objects will become apparent in the entire disclosure.

According to a first aspect of the present invention, the foregoing object is attained by providing a speed change control apparatus for an automatic transmission having a plurality of friction elements in which a gear stage is established by engaging one of the friction elements and disengaging one of the others, the speed change control apparatus comprising: control valves connected to respective ones of the friction elements, a duty solenoid valve connected to each control oil line supplying a respective one of the control valves with control hydraulic pressure, and control means for engaging one friction element by outputting an engagement duty signal to one duty solenoid valve to control the control hydraulic pressure, and disengaging one of the other friction elements by outputting a disengagement duty signal, in response to the timing of said engagement duty signal, to one of the other duty solenoid valves to control the control hydraulic pressure.

According to a second aspect of the invention there is provided a speed change control apparatus for an automatic transmission having a plurality of friction elements in which a gear stage is established by engaging at least one of the friction elements and disengaging at least one of the others, the speed change control apparatus comprising:

control valves connected to respective ones of said friction elements, each control valve having a control oil line for supplying it with control hydraulic pressure;

a duty solenoid valve connected to the control oil line of each control valve; and control means for engaging one friction element by outputting a duty signal to any one of the duty solenoid valves to control the control hydraulic pressure, for engaging and disengaging the associated friction element.

In the operation of the above-described speed change apparatus, the control means outputs an engagement duty signal to one duty solenoid valve to control the control pressure by actuating this solenoid valve. In accordance with this control hydraulic pressure, the friction element is engaged upon setting a hydraulic pressure characteristic desired with regard to hydraulic pressure outputted by the one control valve. In correspondence with the engagement duty signal output, the control means outputs a disengagement duty signal to each of the other duty solenoid valves so that the friction elements are disengaged upon setting hydraulic pressure characteristics desired with regard to the hydraulic pressures outputted by the other control valves, in a manner similar to that set forth above. By optionally setting the engagement and disengagement duty signals upon bringing them into correspondence with each other, the timings and characteristics of the engagement and disengagement hydraulic pressures can be made to correspond, thereby making it possible to achieve an well-timed speed change and to mitigate shock when gears are shifted.

The present invention has a number of outstanding advantages. Specifically, by controlling the control valves in response to actuation of the duty solenoid valves, gear-shift shock is mitigated and the timing of the engagement and disengagement of the plural friction elements is controlled. This makes it possible to dispense with the one-way clutch or timing valves and accumulators employed in the prior art. As a result, the transmission itself and the control section can be simplified and costs can be reduced.

When accumulators and timing valves are used as in the prior art, it is required to adjust each accumulator and timing valve as well as the associated accumulator springs and timing springs in order to set a desired hydraulic pressure characteristic. With the present invention, however, it is possible to obtain any desired hydraulic pressure characteristic merely by optionally setting the duty solenoid valve modulating rate (the output characteristic of the valve per se based on control f the ratio of pulse width to one period of the pulses, namely the duty ratio). This provides a very high degree of freedom in terms of settings made by a program.

Further, in accordance with the invention, the hydraulic pressure of a friction element is controlled to assume a predetermined hydraulic pressure by feeding back the control hydraulic pressure of the friction element or output shaft torque. This makes it possible to readily deal with a deterioration in shift feeling caused by a change in hydraulic pressure or a change with time resulting from wear of the friction members.

Other features and advantages of the present invention will be apparent from the following description taken in conjunction with the accompanying drawings.

DETAILED DESCRIPTION

Discussion of the Prior Art

Figure 8:
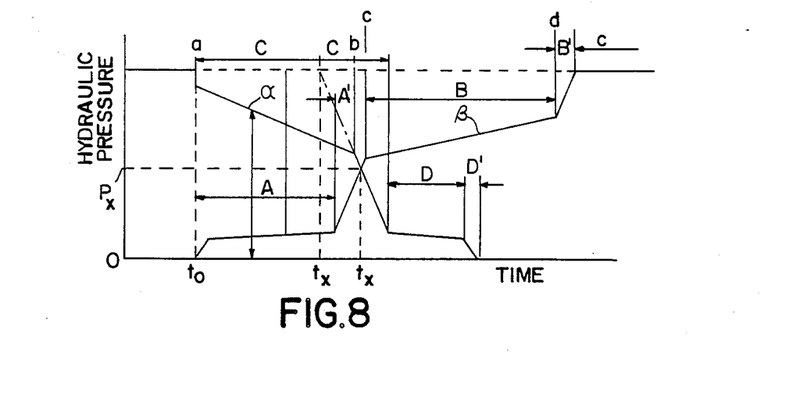
FIG. 8 is a view showing hydraulic pressure characteristics for engaging and disengaging friction elements.
Figure 9:
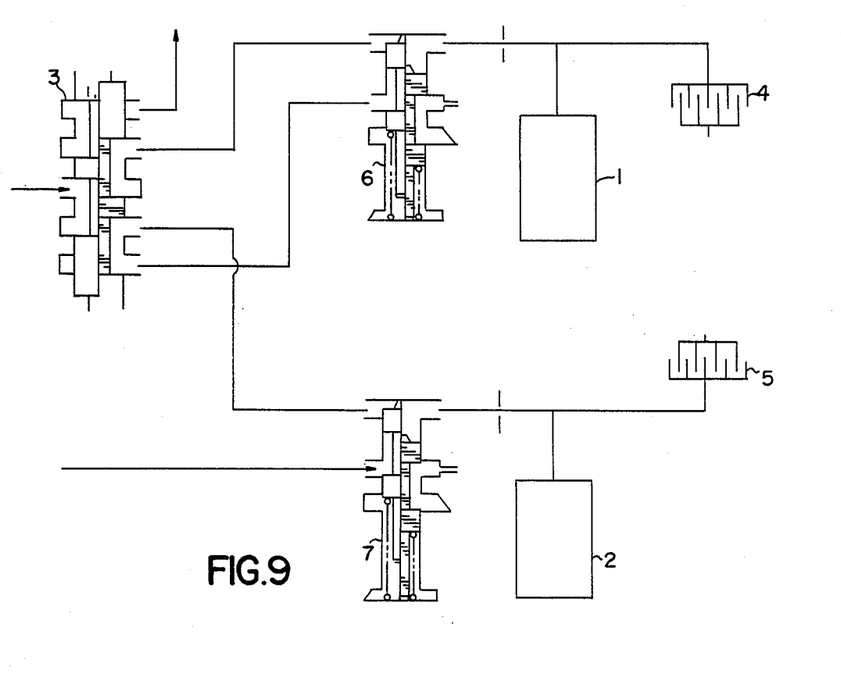
FIG. 9 a hydraulic circuit diagram showing a speed change control apparatus according to the prior art.

As shown in FIG. 8, in an interval A, a piston urging a friction member performs a long stroke until reaching intimate contact with the friction member, wherein the higher the pressure in this interval, the quicker the piston travels its stroke. In the prior art, this is decided by the opening degree of an orifice and the load resistance of the piston. The orifice is provided upstream of an accumulator (downstream of the control output port of a control valve), and line pressure is supplied to the upstream side of the orifice, i.e., to the control valve side. An interval B is for controlling the engaging state of the friction member (in which transmission torque increases substantially in proportion to pressure). Though the change need not necessarily be linear, it is required that the pressure be varied at a prescribed slope in order to achieve engagement smoothly. In the prior art, this is accomplished in accordance with the aforementioned orifice diameter and the accumulator characteristic. More specifically, the line pressure is introduced upstream of the orifice and the piston located within the accumulator compresses a spring as the pressure rises in the control line (in the region downstream of the orifice). As a result, the differential pressure across the orifice, namely the control line pressure is controlled by absorbing oil in the control line into the accumulator. In an interval B', the piston inside the accumulator strikes a stopper to end its stroke, as a result of which pressure rises to the pressure on the upstream side of the orifice. In an interval C, the orifice fore-pressure falls substantially to atmospheric pressure due to operation of a shift valve in correspondence with the timing of interval A. In consequences, pressurized oil which has accumulated in the accumulator through the orifice is discharged. At this time a pressure differential across the orifice is generated in correspondence with the discharge flowrate, and the control line pressure gradually diminishes. When the control line pressure on the engaged side attains a predetermined pressure $P_x$, the control line pressure on the disengaged side suddenly decreases. This is brought about by operation of a valve so provided as to bypass the orifice, the control line pressure flowing through this valve to produce the aforementioned sudden drop in pressure. In an interval D, a slight residual pressure is produced in order to discharge oil corresponding to the cross-sectional area of the piston until the piston, which has been in contact with the friction element, is returned to a predetermined position (a position at which a clearance is formed between friction elements) by a return spring. The pressures in the intervals C and D have characteristics which are completely meaningless in terms of control and there are no problems even if duty control pressure is controlled to have the characteristic indicated by the phantom line in FIG. 8. Accordingly, as previously mentioned, the conventional hydraulic circuit as shown in FIG. 9 requires a long spool of the shift valve 3, and additional timing valves for controlling the timing of two friction elements, resulting in a large size of the hydraulic control section.

Preferred Embodiments

The present invention will now be described in detail on the basis of embodiments shown in the drawings.

Figure 1:
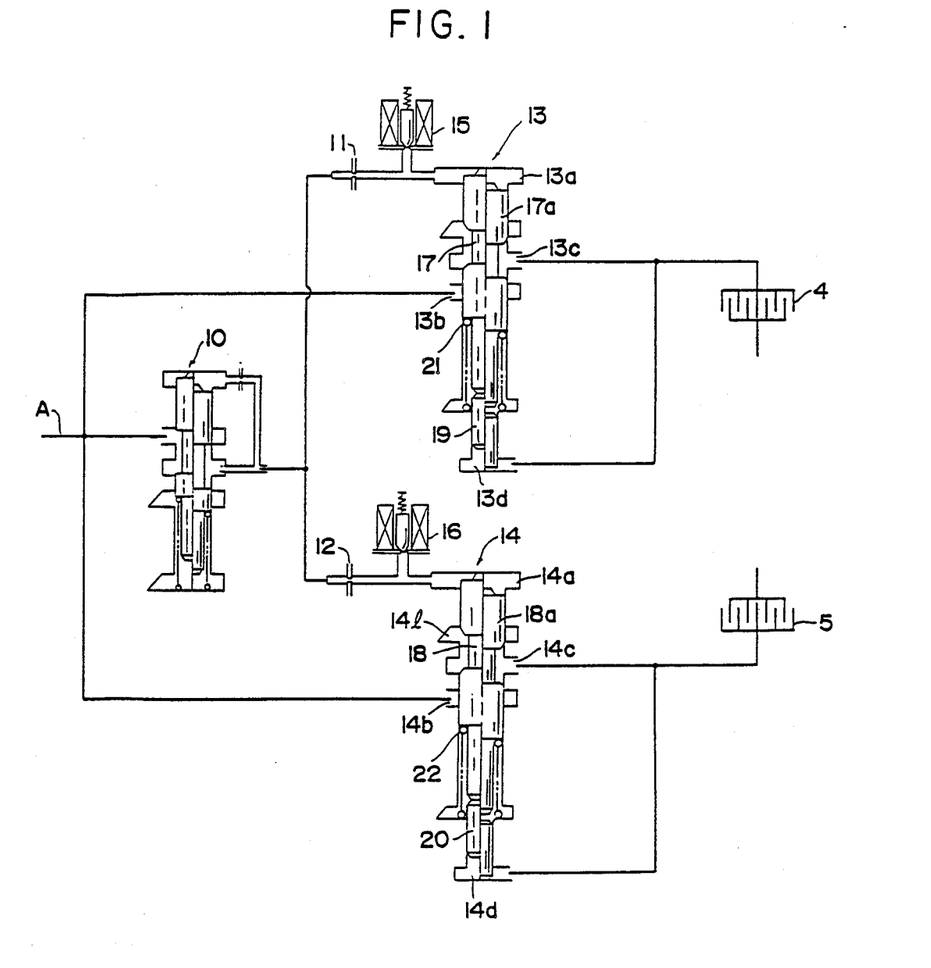
FIG. 1 is a hydraulic circuit diagram illustrating an embodiment of the invention.

FIG. 1 illustrates a speed change control apparatus for controlling the timing at which two friction members 4 and 5 are engaged and disengaged. Pressurized oil A introduced to a modulator valve 10 from a regulator valve (not shown) is regulated to a constant pressure by the modulator valve 10. The pressurized oil is introduced to control oil chambers 13a, 14a, located at the upper ends of respective control valves 13, 14 as shown in FIG. 1, via respective orifices 11, 12. Normally-closed duty solenoid valves 15, 16 are connected between the orifice 11 and the control valve 13 and between the orifice 12 and the control valve 13.

The control valves 13, 14 have respective inlet ports 13b, 14b to which pressurized oil (line pressure) is introduced from respective regulator valves, and respective outlet ports 13c, 14c to which the friction members 4, 5 are connected. The outlet ports 13c, 14c are further connected to respective control oil chambers 13d, 14d located at the lower ends of the control valves 13, 14, respectively, as shown in FIG. 1. The pressures in the chambers 13d, 14d act against the pressures in the chambers 13a, 14a, respectively. Springs 21 and 22 are disposed to urge the spools 17, 18 toward the chambers 13a, 14a (upward in FIG. 1), respectively.

Figure 2:
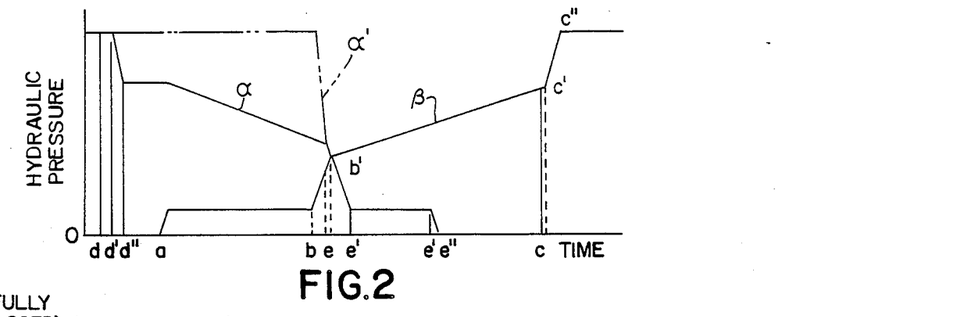
FIG. 2 is a view showing hydraulic pressure characteristics realized wit the present invention.
Figure 3:
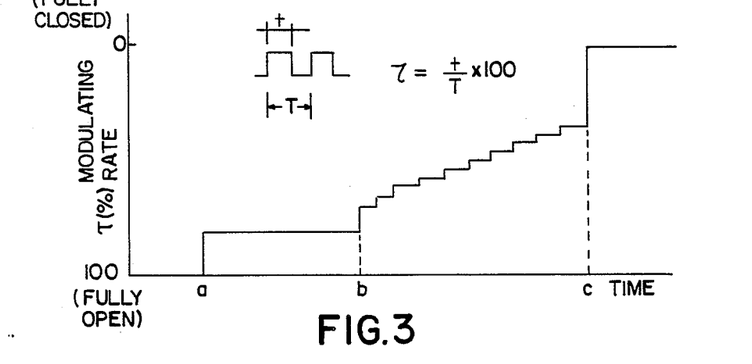
FIGS. 3 and 4 are views showing modulating rate characteristics for setting the hydraulic pressure characteristics of FIG. 2.
Figure 4:
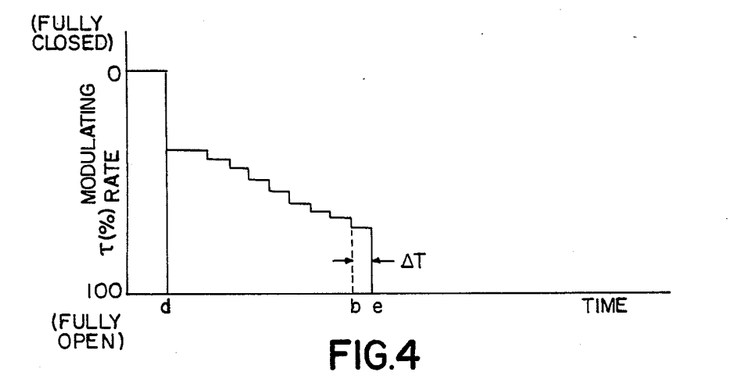

In order to obtain a hydraulic pressure characteristic of the kind shown in FIG. 2 for a case where the friction member 4 is engaged and the friction member 5 is disengaged by the above-described speed change control apparatus, the duty of the duty solenoid valve 15 is controlled to the modulating rate shown in FIG. 3 by a computer, not shown, and the duty of the duty solenoid valve 16 is controlled to the modulating rate shown in FIG. 4 by the computer, whereby the prescribed control pressure is attained. Since this control pressure is determined only in accordance with the modulating rate characteristics shown in FIGS. 3 and 4, the control pressure can be deemed to be determined independently of other factors, such as the speed ratio between input and output shafts of the transmission, for example.

Hydraulic pressure P controlled by each of the control valves 13, 14 is expressed by the following:

$$P = \frac{Ps \times S1 - Fs}{S2}$$

where S1 represents the pressure-receiving surface area of lands 17a, 18a of respective spools 17, 18, S2 represents the pressure-receiving surface area of plungers 19, 20, Ps represents the hydraulic pressure inside the control oil chambers 13a, 14a (namely hydraulic pressure controlled by applying discharge resistance in balanced fashion to oil which flows in from the orifices 11, 12 by operation of the duty solenoid valves 15, 16), and Fs represents the load of the springs 21, 22.

Accordingly, if the duty solenoid valve 15 is operated in accordance with the modulating rate characteristic of the kind shown in FIG. 3, the pressure Ps inside the control oil chamber 13a of the control valve 13 gradually increases due to an increase in the closing ratio that accompanies a decline in the modulating rate (on the closed side). The spool 17 is driven downwards, so that outlet port 13c is to communicated to the inlet port 13b, whereby the hydraulic pressure characteristic of the kind shown at $\beta$ in FIG. 2 is obtained. Simultaneously the hydraulic pressure Ps' inside the control oil chamber 14a of control valve 14 gradually decreases due to operation of the duty solenoid valve 16 in accordance with the modulating rate characteristic shown in FIG. 4. Accordingly, the spool 18 is urged upwardly by the biasing force of spring 22 to cut off the inlet port 14b from the outlet port 14c and communicate the outlet port 14c with an exhaust port 14e, whereby a hydraulic pressure characteristic of the kind shown at $\alpha$ in FIG. 2 is obtained.

In accordance with the hydraulic pressure characteristic $\beta$ of FIG. 2, point a at the initial rise in pressure corresponds to point a in the modulating rate characteristic of FIG. 3. Hydraulic pressure increases in the interval from the fully open state to the closed state of solenoid valve 15 and is maintained at a predetermined modulating rate until point b. When the pressure reaches the point b, the modulating rate is reduced further to raise the pressure. The pressure rises to b' in correspondence with the compressibility of the oil from point b onward. Until point c is attained, the pressure increases at a predetermined pressure slope with a decline in the modulating rate. Engagement of the friction member 4 is performed over a range extending substantially from the point b' to the point c.

The subsequent rise in pressure (c'-c'') takes place when the modulating rate is zero at point c, namely when the solenoid valve 15 is fully closed.

In the hydraulic pressure characteristic $\alpha$ of FIG. 2, the initial decline in pressure (d'-d'') is brought about by an increase in the modulating rate at point d in the modulating rate characteristic of FIG. 4. The pressure gradually diminishes with the increase in modulating rate until point e. When the modulating rate becomes 100%, namely when the solenoid valve 16 is fully opened at point e, the hydraulic pressure falls to approximately atmospheric pressure by following a typical pattern e', e'', e'''. Here the friction member 5 is substantially disengaged from the point e' onward. As for the characteristic $\alpha$ of FIG. 2, no particular problems are encountered even if the characteristic is $\alpha'$.

In a case where the friction member 4 is disengaged and the friction member 5 is engaged, it will suffice to control the duty of duty solenoid valve 15 in accordance with the modulating rate characteristic of FIG. 4 and the duty of duty solenoid valve 14 in accordance with the modulating rate characteristic of FIG. 3.

Figure 5:
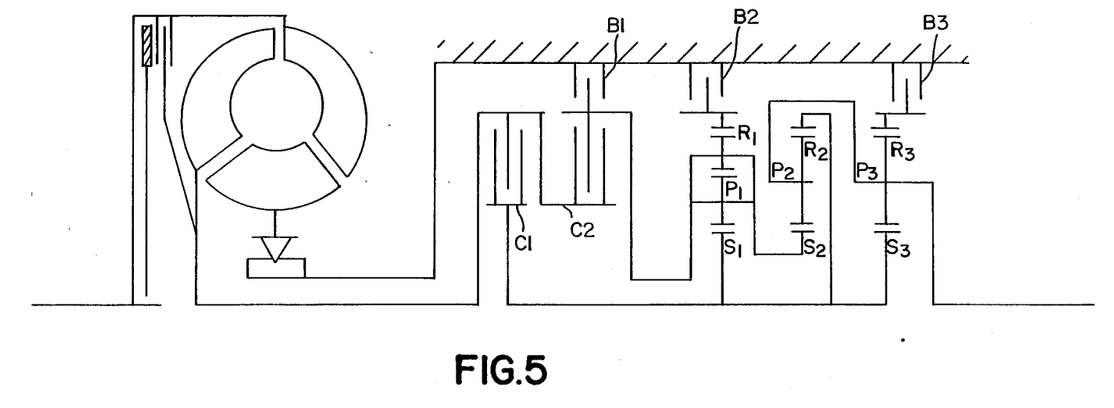
FIG. 5 is a view of a four-speed gear train controlled by the invention.

FIG. 5 illustrates an example of a four-speed transmission gear train which does not use a one-way clutch. The operating states of the gear train friction members, namely clutches $C_1$, $C_2$ and brakes $B_1$, $B_2$, $B_3$, in each of the gear stages is as shown in the following table:

TABLE

| | CLUTCH | | BRAKE | | |
|---|---|---|---|---|---|
| | $C_1$ | $C_2$ | $B_1$ | $B_2$ | $B_3$ |
| REV | | 0 | | | 0 |
| N | | | | | 0 |
| 1st | 0 | | | | 0 |
| 2nd | 0 | | | 0 | |
| 3rd | 0 | | 0 | | |
| 4th | 0 | 0 | | | |

Figure 6:
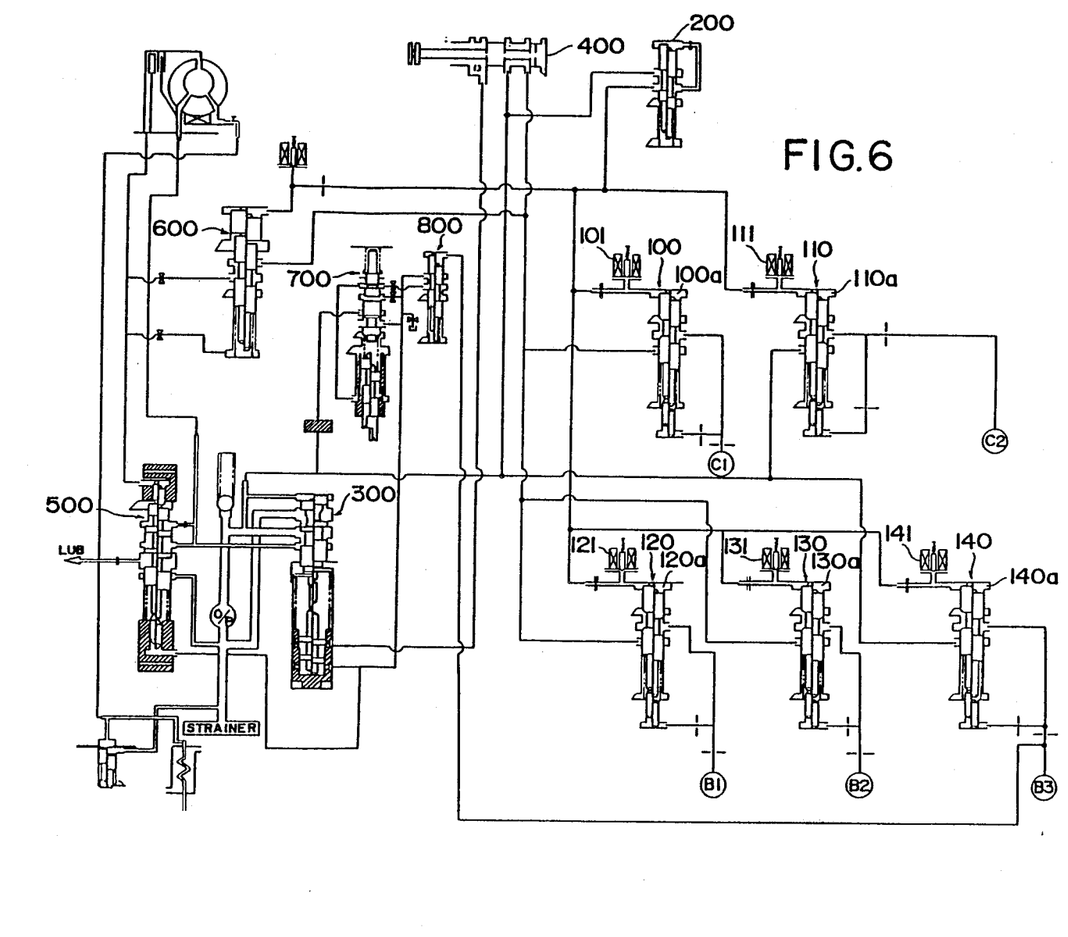
FIG. 6 is a hydraulic circuit diagram in accordance with the invention for controlling the gear train of FIG. 5.

FIG. 6 illustrates a speed change control apparatus in accordance with the present invention as applied to the gear train of FIG. 5. The apparatus includes a control valve 100 and a duty solenoid valve 101 for clutch $C_1$, a control valve 110 and a duty solenoid valve 111 for clutch $C_2$, a control valve 120 and a duty solenoid valve 121 for brake $B_1$, a control valve 130 and a duty solenoid valve 131 for brake $B_2$, and a control valve 140 and duty solenoid valve 141 for brake $B_3$.

The arrangement is such that pressurized oil from a modulator valve 200 is introduced to control oil chambers 100a, 110a, 120a, 130a and 140a of the respective control valves 100, 110, 120, 130 and 140. It is also arranged so that pressurized oil from a primary regulator valve 300 is introduced to inlet ports of the respective control valves 110, 140, and so that pressurized oil from the primary regulator valve is introduced to inlet ports of the respective control valves 100, 120, 130 via a manual valve 400.

Control of timing for engaging and disengaging the clutches $C_1$, $C_2$ and brakes $B_1$, $B_2$ and $B_3$ is performed by controlling the duty of the duty solenoid valves 101, 111, 121, 131 and 141, respectively, in a manner similar to that described above.

In FIG. 6, numeral 500 denotes a secondary regulator valve, 600 a lock-up valve, 700 a throttle valve and 800 a cut-back valve.

The solenoid valves may be of the normally-open type if desired, in which case the solenoid valves would be fully closed at a modulating rate of 100% in FIGS. 3 and 4 and fully open at a modulating rate of 0%.

Figure 7:
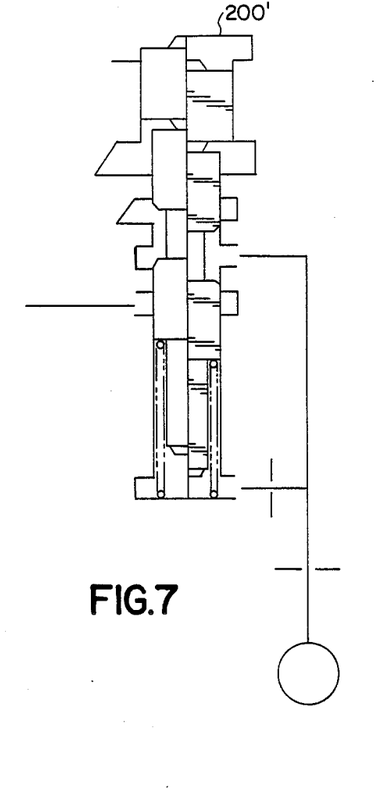
FIG. 7 is a view illustrating another embodiment of a control valve.

Note that a control valve 200' shown in FIG. 7 illustrates another embodiment of a control valve.

As many apparently widely different embodiments of the present invention can be made without departing from the spirit and scope thereof, it is to be understood that the invention is not limited to the specific embodiments thereof except as defined in the appended claims.

What is claimed is:

1. Speed change control apparatus in an automatic transmission having a plurality of friction elements in which a gear stage is established by engaging one of the friction elements and disengaging one of the others, said speed change control apparatus comprising:
   control valves connected to respective ones of said friction elements, each control valve having a control oil line for supplying it with control hydraulic pressure;

a duty solenoid valve connected to the control oil line of each control valve; and control means for engaging one friction element by outputting an engagement duty signal to one duty solenoid valve to control its control hydraulic pressure, and for simultaneously disengaging one of the other friction elements by outputting a disengagement duty signal to one of the other duty solenoid valves to control its control hydraulic pressure.

2. The speed change control apparatus as defined in claim 1, wherein said control means comprises means for controlling the pattern and timing of said hydraulic pressures applied to said solenoid valves.

3. The speed change control apparatus as defined in claim 1, wherein said control valve includes a spool and a first oil chamber acting on the spool, and said control oil line is connected to the first oil chamber.

4. The speed change control apparatus as defined in claim 1, wherein said control oil line is connected to a modulator valve providing a constant pressure to the control oil line.

5. The speed change control apparatus as defined in claim 4, wherein an orifice is provided in said control oil line between the duty solenoid valve and the modulator valve.

6. The speed change control apparatus as defined in claim 3, wherein said control valve includes a spring urging said spool towards the first oil chamber.

7. The speed change control apparatus as defined in claim 3, wherein said control valve includes a second oil chamber acting on the spool against the first oil chamber, and a pair of inlet and outlet ports which are communicated and discommunicated by said spool, said outlet port being connected to one of the friction elements and the second oil chamber.

8. The speed change control apparatus as defined in claim 7, wherein said control valve includes a plunger slidably disposed between said spool and the second oil chamber, said plunger moving between positions abutting and spaced from said spool.

9. The speed change control apparatus as defined in claim 7, wherein the spring is disposed in a chamber disposed between said two oil chambers.

10. The speed change control apparatus as defined in claim 7, wherein the spring is disposed in the second oil chamber.

11. The speed change control apparatus as defined in claim 1, wherein said duty solenoid valve is of a normally closed or normally open type.

12. The speed change control apparatus as defined in claim 1, wherein said control means includes a period of time in which the control hydraulic pressure is stepwise increased for one of the friction elements.

13. The speed change control apparatus as defined in claim 12, wherein said control means includes a period of time in which the control hydraulic pressure for one of the other friction elements is stepwise decreased.

14. The speed change control apparatus as defined in claim 1, wherein said control means includes a period of time in which the control hydraulic pressure is constant.

15. In an automatic transmission having a plurality of friction elements in which a gear stage is established by engaging at least one of the friction elements and disengaging at least one of the others, a speed change control apparatus comprising:

control valves connected to respective ones of said friction elements, each control valve having a control oil line for supplying it with control hydraulic pressure;

a duty solenoid valve connected to the control oil line of each control valve; and control means for engaging one friction element by outputting a duty signal to any one of the duty solenoid valves to control its control hydraulic pressure, for engaging and disengaging the associated friction element;

said duty signals for engaging and disengaging following a predetermined modulating rate characteristic map which is independent of a speed ratio between an input shaft and an output shaft of the transmission.

16. In an automatic transmission having a plurality of friction elements in which a gear stage is established by engaging at least one of the friction elements and disengaging at least one of the others, a speed change control apparatus comprising:

control valves connected to respective ones of said friction elements, each control valve having a control oil line for supplying it with control hydraulic pressure;

a duty solenoid valve connected to the control oil line of each control valve; and control means for engaging one friction element by outputting an engagement duty signal to one duty solenoid valve to control its control hydraulic pressure, and for simultaneously disengaging at least one of the other friction elements by outputting disengagement duty signals to at least one of the other duty solenoid valves associated with said other friction elements to control its control hydraulic pressure.

17. The speed change control apparatus as defined in claim 1, wherein said friction elements are associated with forward speeds.

18. The speed change control apparatus as defined in claim 17, wherein the transmission further includes a friction element establishing a forward range, and said control apparatus further outputs a corresponding duty signal for a duty solenoid valve associated with this friction element for the forward range.

19. The speed change control apparatus as defined in claim 17, wherein the transmission further includes a reverse speed which is established by engaging any two of said friction elements, and said control apparatus further outputs corresponding duty signals for duty solenoid valves associated with the two friction elements.

* * * * *